April 7, 1964    J. A. SCOTT    3,127,973
BALE LOADER

Filed Jan. 31, 1963    2 Sheets-Sheet 1

INVENTOR.
JOSEPH A. SCOTT
BY
ATTORNEY

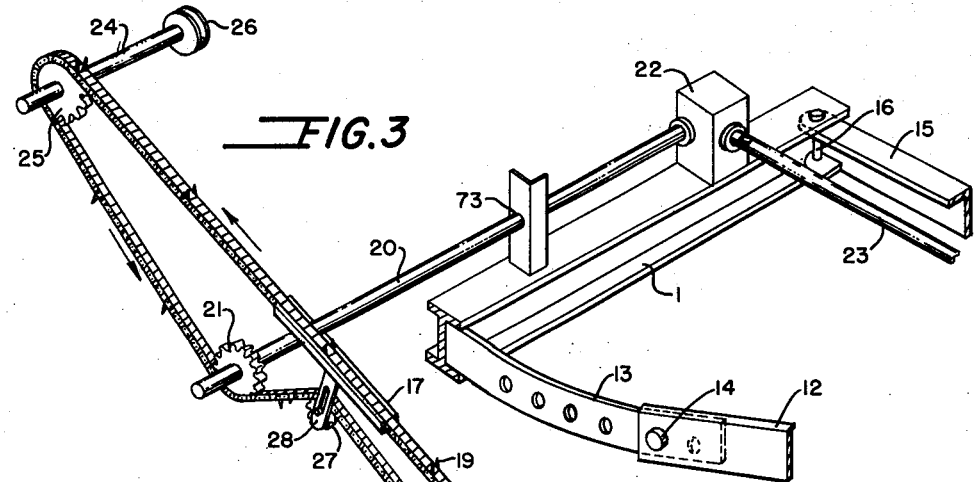
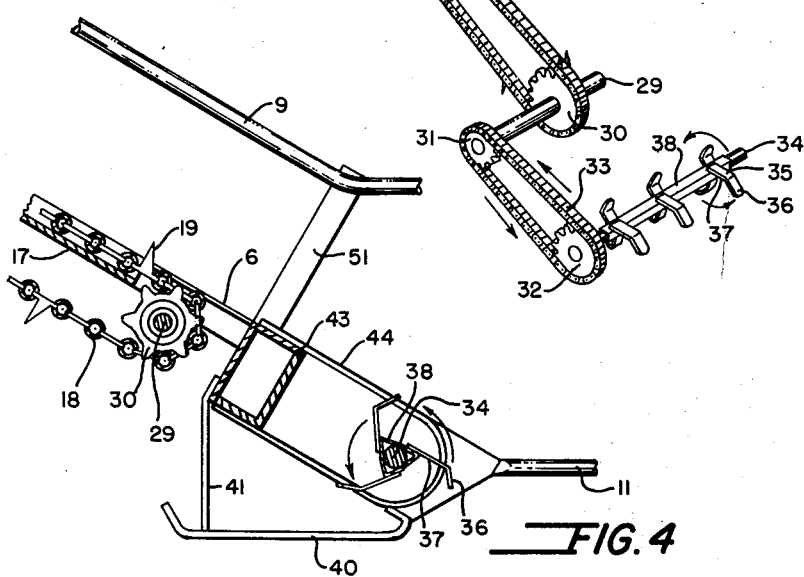
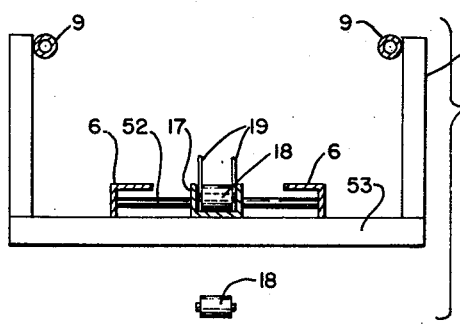

United States Patent Office 3,127,973
Patented Apr. 7, 1964

3,127,973
BALE LOADER
Joseph Alexander Scott, Turners Station, Ky.
Filed Jan. 31, 1963, Ser. No. 255,403
7 Claims. (Cl. 198—7)

This invention relates to new and useful improvements in bale loaders. More specifically, this invention relates to a portable apparatus adapted to pick up material in the form of bales from the ground and transporting and elevating said bales to a wagon or storage building.

In the harvesting of crops such as hay, it is commonly expedient to make bales and scatter these along the ground in more or less evenly defined rows. Later wagons are brought into the field and the bales are loaded thereon by hand and transported to the barn or other storage facility. In the past, various forms of loading devices of this character have been developed but these devices have not been wholly satisfactory. Many of these devices have been in the form of portable inclined chutes which have been powered by the wheels of the portable device itself. Thus, these devices have been operative only when the chute is in motion and, as a consequence, operate at a speed proportional to the motion of the device. Thus, these devices are inoperative at slow ground speeds, such as are encountered in sharp turns in small plots in rough terrain. Still other of these devices have been designed to overcome the problem of upending of a bale and have utilized a normal floating position maintained by resilient means so that the chute lowers upon contact with the bale. Other expedients have included contact bars above the chute which tend to knock the bale over in the event that it becomes upended so that it can be conveyed onto the conveyor. The relative complexity of these devices has increased their cost to the extent that the bale loaders have not been commercially successful.

Accordingly, it is an object of this invention to provide simple and practical means for picking up and conveying bales of materials from the ground to a wagon.

Another object of this invention is to provide means for operatively mounting a bale loader of this character onto a tractor for operating the conveyor from the power take off.

A further object of this invention is to provide a bale loader in which the conveyor is operated by the power take off of the tractor and which can be used in conjunction with other conveying equipment either as a conveyor or as an accessory elevator.

Still another object of this invention is to provide a bale loader in which the conveyor assembly is adapted to be secured in lifted position for the purpose of moving the loader or for the purpose of use in conjunction with other conveyor apparatus.

Other objects of this invention not specifically mentioned will appear in the following specification which describes my invention with reference to the accompanying drawings.

Referring now to the drawings, FIG. 1 is a side elevation of the bale loader of this invention.

FIG. 3 is a fragmentary view in perspective which illustrates the power train of the conveyor portion and pick up portion of the bale loader.

FIG. 4 is a fragmentary sectional view taken along lines 4—4 of FIG. 2 which illustrates in more detail the lower end of the conveying portion of the apparatus and the pick up portion.

FIG. 5 is a vertical sectional view of the apparatus taken along lines 5—5 of FIG. 2 which illustrates the operative relationship of the upper and lower flights of conveyor chain to each other and to the frame and side rails of the device.

Figure 1:
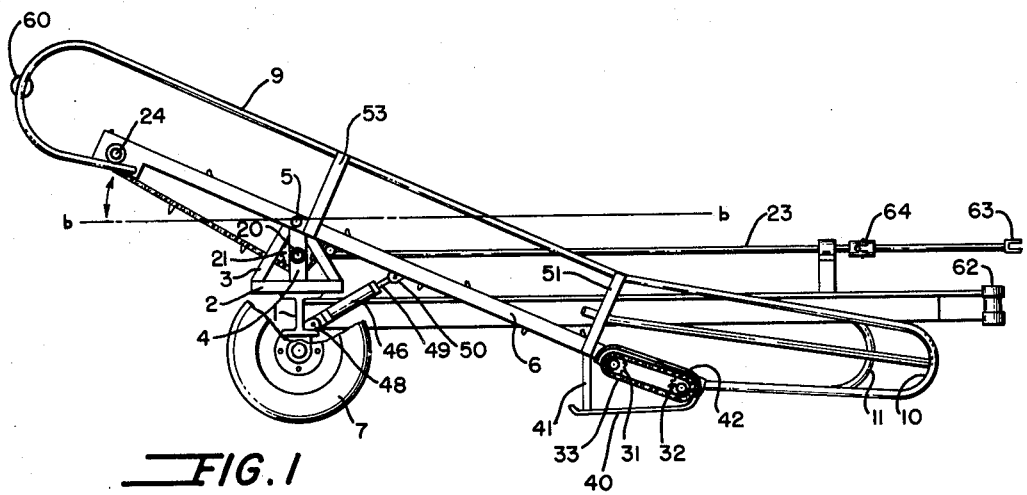
Figure 2:
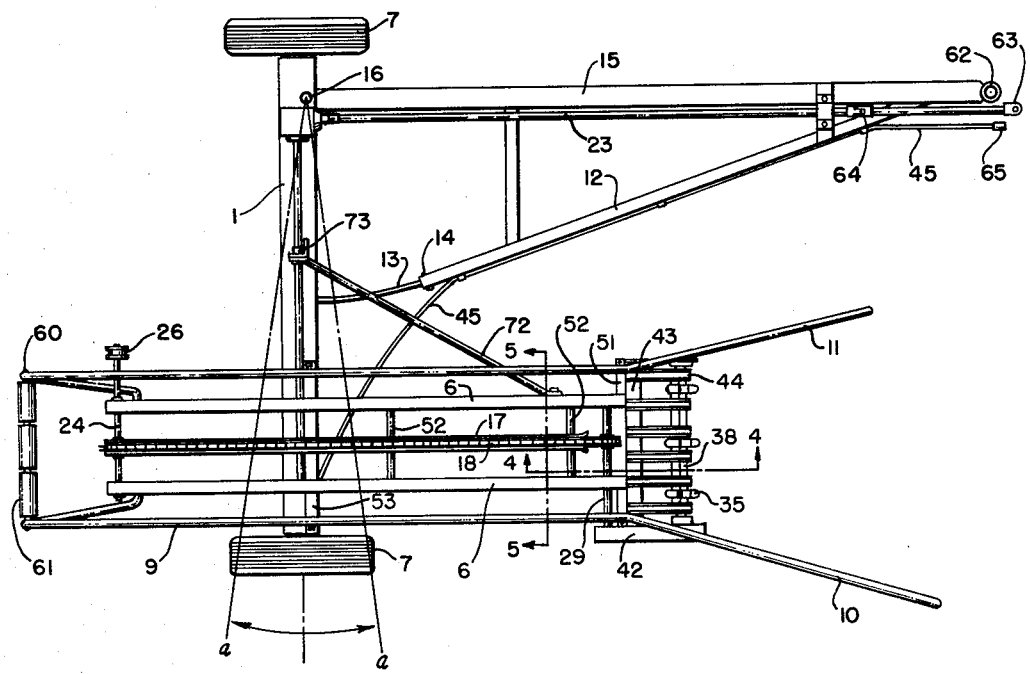
FIG. 2 is a plan view of said bale loader illustrating the entire assembly.

My improved hay loader comprises an inclined chute having three distinct portions: a pick up portion, a conveyor portion and an unloading portion. The conveyor portion comprising an endless chain is powered by shafts 20 and 23 through gear box 22 by a conventional live power take off of a tractor. Thus, since the speed of the take off is independent of the speed of the tractor, the conveyor chain can be operated at any speed desired. The same power train is utilized to rotate the shaft of the pick up portion containing specially designed tongues which pick up and convey the bales to the conveyor chain without digging in or upending same regardless of land speed.

Referring now in detail to the drawings, the bale loader has a mobile frame which includes transverse beam 1, having attached thereto a fixed frame made up of brace members 2 and 3 in which brace member 2 forms the base and members 3 form the sides of a triangle. Secured to the middle of member 2 and rising vertically to the apex of the triangle at point 5 is a brace 4 which forms a pivot point at point 5 and a support for shaft 20, journaled therein. The inclined chute is made up of side rails 6 attached by support pieces 52 and welded to beam 43 at its lower end. These rails are pivoted at point 5 to the fixed frame previously described. The transverse beam 1 contains an axle not shown which supports wheels 7 at either end.

Tubular side rails 9 run the length of the conveyor portion and extend at either side to form outwardly flanged guide means 10 and 11, respectively. Each of the guide rails are supported at either end to side rails 6 and intermediately by transverse and vertical brace assemblies 51 and 53.

The other side of the transverse beam supports a tractor hitch frame which is made up of an inner side, containing members 12 and 13 and an outer side member 15. The outer side member pivotably attached to the transverse beam by pin 16. The inner side member contains a bowed portion 13 containing a series of holes along its length to which straight portion 12 may be attached by means of pin 14. Thus, it is possible to adjust the length of the inner side member and by means of the pivot pin 16 pull the entire assembly either forward or backward, i.e., away or toward the tractor as is indicated by imaginary lines a—a. Thus, the unit can be placed directly behind the tractor when not in operation as, for example, when transporting it and the loaded wagon to the hay storage area. The straight portion of the tractor hitch frame 12 meets with the outer side member 15 to form the apex of a triangle, near which a tractor hitch is attached at 62. A brace 72 is attached at one end to side rail 6 and at the other end to sleeve member 73, slidably positioned on shaft 20.

Referring now to FIG. 3, the driving mechanism of the conveyor can best be described as follows. The conveyor itself consists of an endless chain 18 which is supported along the top portion of the chute by member 17. The chain contains a series of equally spaced barbs 19 which are adapted to engage with the bale. The chain is driven by shaft 20 and sprocket 21 which in turn is operatively connected with a gear box 22. Shaft 23 attaches via universal couplings 13 and 64 to the power take off of the tractor and engages with the gears of gear box 22 to drive shaft 20. At the front end of the chute there is a shaft and sprocket assembly 29 and 30, acting as an idler sprocket and shaft and which contains an additional sprocket 31 at the other end to power chain 33 via sprocket 32. At the rear end of the chute is disposed an idler sprocket 25 and its associated shaft 24 containing a pulley 26 at its other end for engagement with accessory conveyor apparatus. A tension adjusting sprocket 27 is supported by member 28 which is held in turn by two adjustable tension springs (not shown) so that sprocket 27 can be adjusted for proper chain tension.

As previously indicated, sprocket 32 is driven by chain 33 trained around sprocket 31 of shaft 29 and thus powers the pick up shaft 34 containing a series of tongues 35. Each of these tongues consist of a base portion 37 and a body portion 36. The base portion 37 is disposed at 90° from the shaft 34 and the body portion is turned downwardly in a direction opposite to that of the rotation of the shaft. In the embodiment shown, the base of the tongue is welded to 3 angle irons 38 disposed about the shaft 34 for ease of attachment to said shaft.

It has been found that it is necessary to fashion the tongues in this manner to prevent them from digging into the bales being picked up or from upending same. Thus the turn-down portion provides a pick up and knuckling action conveying the bale onto the barbs 19 of conveyor chain 18. This construction prevents upending of bales regardless of ground speed.

A series of stripper bars 44 are welded at the top and bottom of transverse beam 43 so as to encircle shaft 34. These stripper bars increase the efficiency of the tongues 35 and prevent hay from becoming entangled with shaft 34. This is best shown in FIG. 4. Further, a guard member 42 is disposed over chain 33 to prevent hay from being enmeshed with sprockets 31 and 32 and its associated chain 33.

A sled-type runner 40 is attached by welding to the base of the chute by vertical leg 41 and this allows the entire chute to slide along the ground and holds the entire assembly two to three inches off the ground.

A hydraulic line 45 runs along the inner member 12 of the tractor hitch frame and terminates at coupling 65 which is adapted to connect with a hydraulic remote control valve of the tractor. Said hydraulic hose connects to hydraulic cylinder 46 which is attached to transverse beam 1 by clevis bracket 48 and its piston rod is attached via clevis bracket 50 to the transverse portion of support assembly 52. Thus, the hydraulic piston rod 49 may be extended to raise the entire assembly from an inclined to a horizontal position as is indicated by line b—b of FIG. 1. In this manner, the chute may be raised for delivery to the barn or it may be used as a horizontal conveyor in conjunction with other hay loading equipment. In this case, pulley 26 powered by shaft 24 may be attached to the accessory equipment and power same for the specific hay loading requirements.

It has been found that the barbs 19 of chain 18 tend to engage with the bales and pull them beneath the chute at the delivery end. Thus, I have provided a roller 61 supported by shaft 60 which is secured to the tubular side rails 9. I have found that by utilizing a roller having several sections in which each section has an internal opening of larger diameter than shaft 60, allows the bales to be separated from barbs 19 and conveyed with greater speed onto the wagon.

Summarizing then, my improved hay loader comprises an inclined chute having three distinct portions: a pick up portion, a conveyor portion and an unloading portion. The conveyor portion comprising an endless chain is powered by shaft 20 and 23 through gear box 22 by the live power take off of the tractor. Thus, since the speed of the take off is independent of the speed of the tractor, I can operate the conveyor chain at any speed desired, regardless of land speed. The same power train is utilized to rotate the shaft of the pick up portion containing specially designed tongues which pick up and convey the bales to the conveyor chain without digging in or upending same, regardless of land speed. By use of the hydraulic cylinder 46 and its piston rod 49, the chute may be raised for transportation to and from the field from an inclined position to a horizontal position or at any intermediate position between these points. Thus, the assembly may be positioned to unload a wagon and through use of pulley 26 power other conveyor equipment such as hay elevators and the like. Due to the fact that the side rails pivot at the exact center of gravity of the chute and that the shaft and sprocket assembly 20 and 21 are located in the middle of the conveyor chain, elevation of the front end of the chute does not affect the tension on the conveyor chain and allows the apparatus to be used at any desired elevation. The pivotable attachment of the tractor hitch frame to the transverse beam by pin 16 and the adjustment afforded by the bowed portion 13 allows the entire assembly to be pulled directly behind the tractor and thus allow it to go through gates and into barn doors, etc. This makes it unnecessary to unhitch the unit from a loaded wagon, when the loader is operated by a two man crew.

It will be appreciated that various details of construction may be varied through a wide range without departing from the principle of this invention and it is therefore not the purpuose to limit the scope of the patent granted hereon.

I claim:

1. A bale loader, adapted to pick up and convey baled materials, which comprises: a mobile frame, an inclined chute conveyor, driving means and lifting means for said inclined chute conveyor in which:

(a) said mobile frame contains a transverse beam having a fixed upright frame portion connected with one side of said beam and a tractor hitch frame connected with the other side of said beam, said tractor hitch frame having inner and outer side members meeting at an apex forwardly of said transverse beam and having a tractor hitch secured thereto near said apex;

(b) said inclined chute conveyor being pivotably attached intermediate at its ends to said fixed upright frame portion and consisting of a pick up portion, a conveyor portion and an unloading portion, said chute conveyor containing side frame members and an endless chain conveyor;

(c) said conveyor portion containing a first sprocket and shaft assembly journaled at the midpoint of said chute, an endless conveyor chain having an upper flight, arranged to travel along the upper surface of said chute and a lower flight arranged to travel under said chute, a series of evenly spaced barbs on said chain, said sprocket of said first sprocket and shaft assembly contacting the lower flight of said chain and driving same, a second sprocket and shaft assembly journaled at the rear of said chute and a third sprocket and shaft assembly journaled at the front of said chute, said second and third sprockets of said assemblies being idler sprockets and having said chain trained over them so as to contact said lower and upper flights;

(d) said pick up portion containing a fourth sprocket and shaft assembly, means operatively connecting said third sprocket and shaft assembly and said fourth sprocket and shaft assembly, the shaft of said fourth sprocket and shaft assembly containing evenly spaced tongues along its length and around its body, each of said tongues having a base portion and a body portion, said base portion being disposed at about 90° from said fourth shaft and said body portion being turned downwardly opposite to the direction of rotation of said fourth shaft, stripper bars connecting said conveyor portion and said pick up portion and adapted to support baled material, and guiding members on either side of said chute projecting forwardly and outwardly and which are adapted to guide bales onto said pickup portion;

(e) said unloading portion containing roller means adapted to disengage bales from the barbs on the chain of said conveyor portion;

(f) driving means for driving said first sprocket and shaft assembly; and (g) lifting means for lifting said chute vertically from an incline to a horizontal position.

2. A bale loader as defined in claim 1, in which said driving means comprises a shaft adapted for operative connection with the power takeoff of a tractor and gear means operatively connecting said shaft to said first sprocket and shaft assembly.

3. A bale loader, as defined in claim 1 in which said outer side member of said tractor hitch frame is pivotably attached to said transverse beam and said inner side member of said tractor hitch frame contains a bowed portion, a straight portion and attachment means for adjustably attaching said straight portion at various positions along said bowed portion, said bowed portion being connected to said transverse beam and said straight portion being attached to said outer side member at the apex.

4. A bale loader, as defined in claim 1 in which said inclined chute contains tubular side members running the length of said chute and forming the guide means of the pickup portion.

5. A bale loader, as defined in claim 1 in which lifting means comprises a hydraulic cylinder and piston rod assembly and a hydraulic hose adapted for operative connection to a hydraulic remote control valve of a tractor.

6. A bale loader, as defined in claim 1 in which said second sprocket and shaft assembly contains a pulley adapted for operative connection with the driving shaft of an accessory conveyor apparatus.

7. A bale loader, as defined in claim 1 in which the front of said inclined chute conveyor contains runners disposed at either side and which are adapted to hold the end of said chute and pickup portion at a predetermined distance from the ground.

References Cited in the file of this patent

UNITED STATES PATENTS

| | | |
|---|---|---|
| 2,597,220 | Appel | May 20, 1957 |
| 2,883,030 | Saunders | Apr. 21, 1959 |